(12) United States Patent
Gonzales

(10) Patent No.: US 6,453,036 B1
(45) Date of Patent: Sep. 17, 2002

(54) DYNAMIC UPDATING OF SCP THROUGH ISUP MESSAGES

(75) Inventor: Julio Gonzales, Tucker, GA (US)

(73) Assignee: Z-Tel Technologies, Inc., Tampa, FL (US)

( * ) Notice: Subject to any disclaimer, the term of this patent is extended or adjusted under 35 U.S.C. 154(b) by 0 days.

(21) Appl. No.: 09/621,725

(22) Filed: Jul. 24, 2000

(51) Int. Cl.[7] .................... H04M 7/00; H04M 3/42; H04J 3/12
(52) U.S. Cl. .................. 379/230; 370/524; 379/201.02; 379/221.08; 379/221.09
(58) Field of Search ............... 370/522, 524; 379/221.08, 221.09, 229, 230, 201.01, 201.02, 201.05

(56) References Cited

U.S. PATENT DOCUMENTS

| | | | | |
|---|---|---|---|---|
| 5,325,419 A | * | 6/1994 | Connolly et al. | 455/435 |
| 5,440,626 A | * | 8/1995 | Boyle et al. | 379/230 |
| 5,454,034 A | * | 9/1995 | Martin | 379/230 |
| 5,499,290 A | * | 3/1996 | Koster | 379/230 |
| 5,657,375 A | * | 8/1997 | Connolly et al. | 455/436 |
| 5,742,668 A | * | 4/1998 | Pepe et al. | 379/93.23 |
| 5,889,782 A | | 3/1999 | Dendi | 370/524 |
| 6,044,259 A | | 3/2000 | Hentilä et al. | 455/406 |
| 6,075,855 A | | 6/2000 | Christiansen et al. | 379/209.01 |

* cited by examiner

Primary Examiner—Harry S. Hong
(74) Attorney, Agent, or Firm—Kenyon & Kenyon

(57) ABSTRACT

Information stored within an SS7 signaling network is inserted within fields of an ISUP signaling message that are not dedicated to another use and the signaling message is sent to a service control point (SCP) within the SS7 network. At the SCP, information is extracted from the ISUP signaling message and existing databases are modified to reflect the addition of the extracted information.

20 Claims, 4 Drawing Sheets

|   | Phone # | L. Name | Call waiting enabled | new messages? | Filter period |
|---|---------|---------|----------------------|---------------|---------------|
| 1 | 404-785-4783 | Frazier | Y | N | 1-2 PM |
| 2 | 503-782-3767 | Willis | N | N | 12 AM - 7 AM |
| 3 | 404-278-1166 | Graham | N | Y | None |
| 4 | 718-568-8899 | Piccone | Y | Y | 10 AM - 3 PM |

FIG 2

FIG 4  Parameters in ISDN User Part Messages

| | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| IAM | M | | M | M | | | | | | | | M | | O | M | | | M |
| INR | M | | | | | | | | | | | | | M | | | | |
| INF | M | | | O | | | | | | | | | M | | | | | |
| CRA | M | | | | | | | | | | | | | | M | | | |
| CRM | M | | | | | | | | | | | | | | | | | |
| COT | M | | | | | | | | | M | | | | | | | | |
| ACM | M | M | | | O | | | | | | | | O | | | | | |
| EXM | M | O | | | | | | | | | | | | | | | | |
| ANM | M | O | | | O | | | | | | | | O | | | | | |
| CPG | M | | | | | | | | | | M | | O | | | | | |
| FOT | M | | | | | | | | | | | | | | | | | |
| REL | M | | | | M | | | | | | | | | | | | | |
| CFN | M | | | | M | | | | | | | | | | | | | |
| CVR | M | | | | | M | | | M | | | | | | | | | |
| CVT RLC | M | | | | | | | | | | | | | | | | | |
| CCR RSC LPA | M | | | | | | | | | | | | | | | | | |
| BLO UBL UCIC | M | | | | | | | M | | | | | | | | | | |
| BLA UBA | M | | | | | | | | | | | | | | | | | |
| SUS RES | M | | | | | | M | | | | | | | | | | | |
| CGB CGU | M | | | | | | M | | | | | | | | | | | |
| CGBA CGUA | M | | | | | | | | | | | | | | | | | |
| GRS GRA CQM | M | | | | | | | | | | | | | | | M | | |
| CQR | M | | | | | | | | | | | | | | | M | | |
| FAC | M | | | | | | | | | | | | | | | M | M | |

Parameters

1 Message Type
2 Backward call indicators
3 Called party number
4 Calling party's category
5 cause indicators 6 circuit group characteristic indicators
7 circuit group sup. Message type
8 circuit state
9 circuit validation response indicator
10 conitunity indicators 11 event information
12 forward call indicators
13 information indicators
14 information request indicators
15 nature of connection indicators 16 range and status
17 suspend/resume
18 user service info

DYNAMIC UPDATING OF SCP THROUGH ISUP MESSAGES

FIELD OF THE INVENTION

The present invention relates to telecommunications, and in particular, to a system and method for dynamically updating information at a storage destination in a signaling network.

BACKGROUND INFORMATION

Telecommunication services typically need to update subscriber information frequently, such as whether new messages have been recorded in a subscriber's voicemail box, to provide optimal performance. By updating this information, a telecommunications service can then rapidly alert subscribers of messages or other events in near real time.

Most telecommunication systems now support the SS7 (Signaling System 7) Integrated Services Digital Network User Part (ISUP) call-control protocol as described in American National Standards Institute (ANSI) standard T1.113-1995, hereby incorporated by reference. This standard provides the protocol guidelines for the SS7 signaling network, which supports communication of all signal traffic.

The SS7 signaling network comprises customer premises equipment (CPEs), links or trunk lines, switches and databases. To provide enhanced services, telecommunication service entities must interact with these SS7 system components and provide them with information and events related to their subscriber base so that appropriate signals are transmitted by the SS7 network * subscriber CPEs.

Within the SS7 system, one of the types of component switches, incumbent local exchange carriers (iLECs) class 5 switches can provide the functionality needed to update subscriber information and arrange for appropriate signaling to the subscriber base. However, these switches are owned and largely controlled by the local exchange carrier companies. For other entities, it is not practical to perform these services directly through the class 5 switches, necessitating other techniques to update information and provide for appropriate signaling.

SUMMARY OF THE INVENTION

Information stored within a signaling network is modified. Information is inserted within fields of a signaling message that are not dedicated to another use and the signaling message is sent to a storage destination within the signaling network. At the storage destination, information is extracted from the message and existing databases are modified to reflect the addition of the extracted information.

In one embodiment, a subscriber database within a service control point is modified. This embodiment comprises assembling an ISUP initial address message containing, within its parameters, new subscriber information and sending the ISUP initial address message to a service control point. At the service control point, specific subscriber information is obtained by identifying and interpreting data stored within particular message parameters. The subscriber database is updated to reflect the obtained information.

BRIEF DESCRIPTION OF THE DRAWINGS

FIG. 2 is a set of subscriber records within an SCP database according to an embodiment of the present invention.

FIG. 4 is a table showing the mandatory parameters to be encoded into ISUP messages according to an embodiment of the present invention.

DETAILED DESCRIPTION

In accordance with the present invention, information stored at a storage destination within a signaling network is updated without having to wait for the official periodic updates performed by the LECs. The updating occurs by sending a particular signaling message containing relevant information that automatically gets routed to the storage destination, and then processing the signaling message using program logic configured within the destination.

In an embodiment of the invention, the storage destination is a Service Control Point (SCP) of an SS7 signaling network, and the signaling message used to update the SCP is an ISUP initial address message. Optional and undefined parameters associated with an ISUP message are filled with subscriber information such as whether a new message has been entered into a particular subscriber's voicemail box, that can be identified using the program logic. Thereafter, relational database tables stored within the SCP are updated. Updates can be made to the tables on an as-needed basis, and can be made with greater frequency than would otherwise be available through the official LEC updates.

Figure 1:
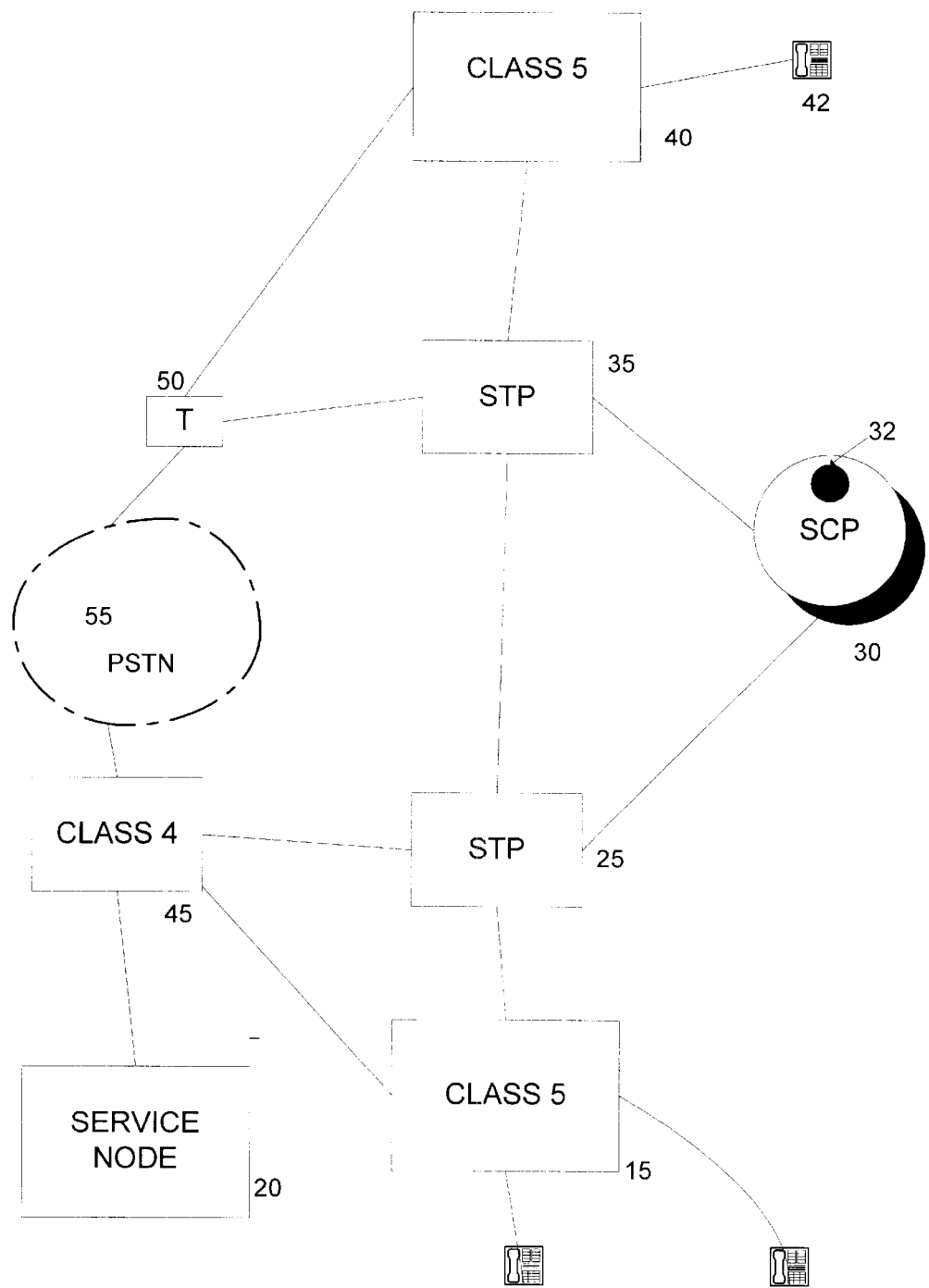
FIG. 1 is a block diagram of a portion of an SS7 signaling network according to an embodiment of the present invention.

In FIG. 1, a class 5 switch 15 is shown connected to CPEs 22, 24, which appear as telephones but can be other telecommunications units such as private branch exchanges (PBXs). Although only two subscriber CPEs 22, 24 are shown, it is to be understood that any number of subscriber units can connect with class 5 switch 15. Another class 5 switch 40 is also shown connected to a corresponding CPE 42. As noted above, class 5 switches are typically controlled by the entities (i.e. the LECs) that differ from those that control the service node 20 (discussed below). The loop between CPEs 22, 24 and the class 5 switch 15 is one local loop, the connection between Class 5 switch 40 and CPE 42 is a separate local loop. When calls are directed to or from outside the local loop, for instance from CPE 24 to CPE 42, the signaling and voice traffic associated with the call may need to travel widely through the general public switched telephone network ("PSTN") 55. For example, a signal may be sent from CPE 24 through Class 5 switch 15 to Class 4 switch 45 then on through the PSTN 55. Thereafter, the signal may be passed on trunk line 50 to Class 5 switch 40 and reach CPE 42.

The class 5 switch 15 is linked to Signaling Transfer Point ("STP") 25. STP 25 acts as a switch directing signaling traffic from service switching points (SSPs) such as the class 5 switch 15 to other service points such as Class 4 switch 45 or other transfer points, such as STP 35. In the figure, STP 25 is in turn linked to Service Control Point 30. Along with its signaling capabilities, the SCP 30 includes a database that various services can use to store data and programs. The stored programs can, for example, be database programs that, given specific input messages, can extract telecommunications service information from the messages and maintain an up-to-date record of telecommunications events associated with a subscriber base.

The service node 20, can be for example, a telecommunications service center operated by any telecommunications service that interacts with LEC equipment and supports various enhanced telecommunications services for a number of subscribers 22, 24. For example, the service node can arrange to filter and block all calls to a particular subscriber 22, 24 between the hours of 1:00 and 2:00 P.M. As no direct connection exists between the subscribers 22, 24 and the service node 20, the service node cannot perform such signaling related functions independently but it can operate through the class 5 switch, and thereby the local loop, to effectuate its services.

The service node 20 can maintain control of a portion 32 of the SCP database for its own uses and store information concerning subscribers in relational database tables. This portion can be in the form of accessible memory space, a particular application within the SCP software environment or a combination of software and hardware. As shown in FIG. 2, the SCP can store fields in a relational database related by subscriber phone number. Records such as call-waiting enabled, new messages and filter period can store either boolean yes/no values or substantive data depending upon the type of information required by each field.

The service node 20 can also store program logic in its portion 32 that can conditionally trigger various signal procedures depending upon the information received in the relational database tables. For example, if in record 1 of FIG. 2, the "new messages?" filter changed from N (None) to Y (new message present), in response to this change, program logic can cause instructions to be sent to the class 5 switch 15 associated with the phone number stored in record 1 to trigger a stutter dial tone when a phone goes off-hook at that number. In this manner, a subscriber can be made aware that new messages are present.

Figure 3:
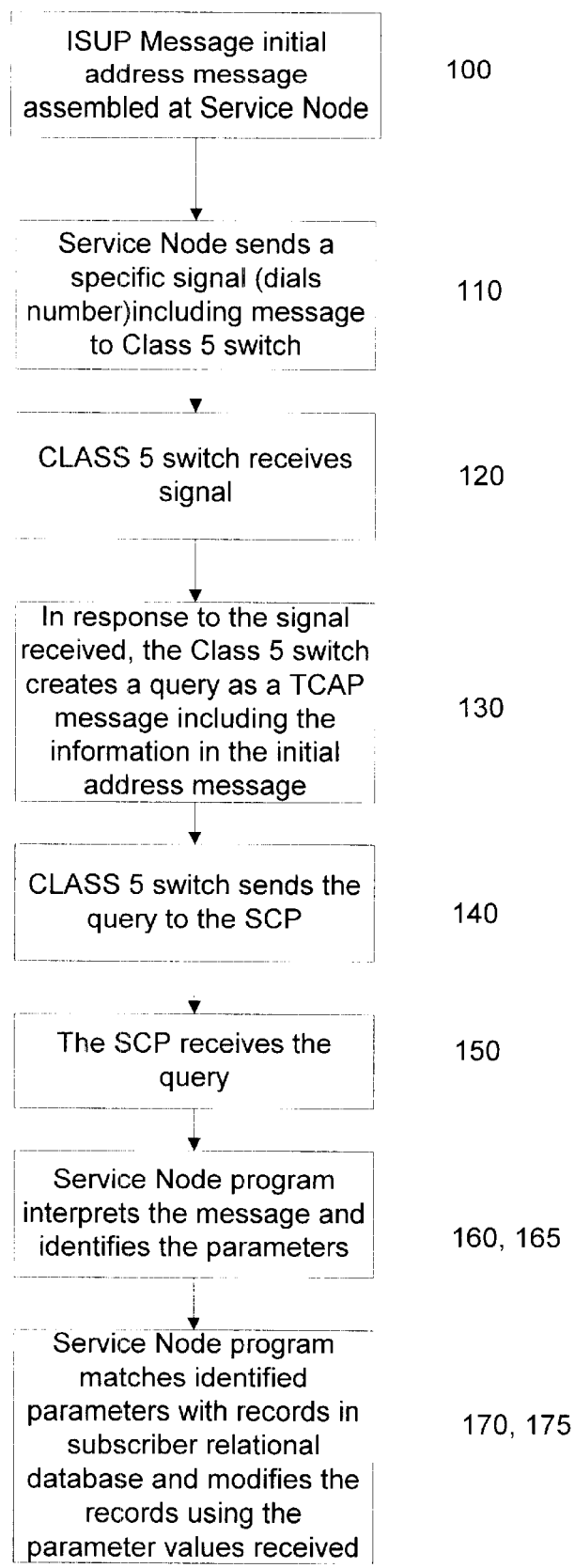
FIG. 3 is a flow chart of a method for dynamically updating an SCP through ISUP messages according to an embodiment of the present invention.

To cause appropriate signals to be generated based upon information in the service node's portion 32 of the SCP 30 database, the information in that portion must be updated closely following upon any messages or other events occur. FIG. 3 shows a method for dynamically updating an SCP through ISUP messages according to an embodiment of the present invention. At step 100, the Service Node 20 commences the updating of information by assembling an ISUP initial address message containing proprietary information within standard ISUP message fields.

Each of the various ISUP signaling message can contain, for example, the four fields depicted in Table 1.

TABLE 1

Routing Label
Circuit Identification Code
Message Type
Parameters

Each field can be formed of an integral number of bytes. The Routing Label identifies the origin and destination of the message, the Circuit Identification Code identifies the particular link along which the signal is assigned to travel, and the Message Type identifies the task to be performed on the selected traffic link. Each ISUP message includes at least one parameter. The ANSI standard contemplates the use of 256 different parameters, although the standard only defines approximately 60 out of the 256.

FIG. 4 shows the defined parameters for each given Message Type listed on the far-left column. There are 18 possible parameters for each Message Type. An "M" designates a mandatory parameter, while an "O" signifies an optional parameter. Such optional parameters can be used to store proprietary information if they are not necessary for the performance of the message. The majority of blank spaces, indicating that the parameter has not been defined, can also be used to store proprietary information, although with some caution because the ANSI has designated some of these undefined parameters as "reserved" parameters for future definition.

The first message type shown in FIG. 4 is "IAM". This is an acronym for "initial address message". This is the message type the Service Node 20 assembles at step 100 to update the SCP 30. As shown, parameters 1, 3, 4, 12, 15 and 18 are mandatory for this message type. Parameter 14 is optional and the remaining parameters are undefined. The service node 20 can insert proprietary information within the optional and undefined parameters such as boolean bits or longer valued data that can represent, inter alia, whether a message has been received, whether call waiting has been enabled, screening parameters such as phone numbers screened and other pertinent service information. The information is coded as bits in specific ISUP parameter locations.

Upon assembling the initial address message containing proprietary information at step 100, at step 110 the service node 20 sends a signal to the local loop class 5 switch 15 by dialing a specific phone number that is a prior established trigger queue at the Class 5 switch 15. Exemplary service node 20 can establish such trigger numbers with the iLECs that own the Class 5 switch. At step 120, the Class 5 switch 15 receives the signal and at step 130, in response to the trigger, creates a query in the form of a TCAP (Transactional Capabilities Application Part) message that incorporates the information contained in the original initial address message in a different format.

At step 140, the Class 5 switch 15 then sends the TCAP message query to the service control point 30. At step 150, the SCP 30 receives the query. At step 160, program logic associated with the appropriated portion 32 of the SCP 30 interprets the message, and at step 165 identifies the information stored with the optional and undefined parameters of the initial address message. For example, the program logic can identify the first four bytes located in parameter #8 of the initial address message as a representation of a particular subscriber's phone number. Similarly, the first bit of parameter #17 can be a flag indicating whether a new message is present in a given subscriber's mailbox, "1" meaning yes, "0" meaning no.

At step 170, the program logic matches the received information with records in the tables stored in the relational databases at SCP 30, or portion 32. After matching at step 170, at step 175 the relational database tables are modified to reflect any changes associated with the new information received 150.

Although various embodiments are specifically illustrated and described herein, it will be appreciated that modifications and variations of the present invention are covered by the above teachings and within the purview of the appended claims without departing from the spirit and intended scope of the invention. For example, although only a limited number of types of modifications have been mentioned, many other types of service updates can be performed using various combinations of the available ISUP message parameters, limited only by the total amount of information such non-mandatory parameters can store.

What is claimed is:

1. A method of modifying information stored within a signaling network, comprising:

inserting subscriber update information within fields of a signaling message that are available for storing information; and sending the signaling message to the signaling network, the signaling message being configured so that the signaling network sends information to a signaling network database;

wherein the information sent to the signaling network database is not directly used in a call sequence.

2. The method of claim 1 wherein the signaling message is an Integrated Services User Part (ISUP) message.

3. The method of claim 2 wherein the signaling network database is a service control point of an SS7 network (SCP).

4. The method of claim 1 wherein:

sending the signaling message to the signaling network includes sending the signaling message to an intermediary switch within the signaling network, and wherein the intermediary switch is triggered by the signaling message to send information to a signaling network database.

5. The method of claim 4 wherein the intermediary switch is a local exchange carrier class 5 switch.

6. The method of claim 1 wherein information is inserted in at least one of optional and undefined parameters of an ISUP message.

7. The method of claim 6 wherein information is inserted in the optional parameters of an ISUP message.

8. The method of claim 6 wherein information is inserted in the undefined parameters of an ISUP message.

9. The method of claim 6 wherein the information is stored in an ISUP initial address message.

10. The method of claim 1 wherein the signaling network database is a service control point.

11. The method of claim 1 wherein the signaling message can be sent when updates to the signaling network database are not scheduled.

12. A method of modifying a communication service subscriber database within a service control point comprising:

extracting information from a signaling message;

obtaining specific subscriber information by interpreting data stored within particular signaling message parameters of the signaling message; and updating the subscriber database based on the obtained information resulting in updated information;

wherein the updated information is not directly used in a call sequence.

13. The method of claim 12 wherein the signaling message is an Integrated Services User Part (ISUP) message.

14. The method of claim 13 wherein a program associated with the service control point extracts and interprets data stored in a particular signaling message when that message has been identified by the program.

15. The method of claim 12 wherein the particular signaling message is a Transactional Capabilities Application Part (TCAP) message.

16. The method of claim 12 wherein the subscriber information includes any information related to communication services provided to the subscribers.

17. The method of claim 12 further comprising:

sending appropriate signaling messages through the signaling network to subscribers based upon updates to the subscriber database substantially immediately after an update has been made to the subscriber database.

18. The method of claim 14 wherein the program associates signaling message parameters with particular subscriber information.

19. A method of relaying subscriber information for updating a signaling network database comprising:

receiving a signaling message, the signaling message being configured to update subscriber information in a signaling network database; and sending the signaling message to a signaling switch connected to the signaling network database;

wherein the subscriber information sent to the signaling network database is not directly used in a call sequence.

20. The method of claim 19 wherein the signaling network database is a service control point in an SS7 signaling network.

* * * * *